United States Patent
Freund et al.

(10) Patent No.: US 8,629,939 B1
(45) Date of Patent: Jan. 14, 2014

(54) TELEVISION TICKER OVERLAY

(71) Applicant: LSI Corporation, Milpitas, CA (US)

(72) Inventors: Joseph Michael Freund, Fogelsville, PA (US); Diego P. DeGarrido, Newtown, PA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/668,626

(22) Filed: Nov. 5, 2012

(51) Int. Cl.
*H04N 5/50* (2006.01)
*H04N 5/445* (2011.01)
*H04N 11/00* (2006.01)

(52) U.S. Cl.
USPC ............ 348/569; 348/564; 348/468; 348/589

(58) Field of Classification Search
USPC ................ 348/569, 468, 564, 598, 600, 465; 725/37, 136, 137
See application file for complete search history.

(56) References Cited

U.S. PATENT DOCUMENTS

| | | | |
|---|---|---|---|
| 5,319,382 A | 6/1994 | Fitzpatrick et al. | |
| 6,833,874 B2 | 12/2004 | Ozaki et al. | |
| 7,196,734 B2 | 3/2007 | Bontempi et al. | |
| 7,697,820 B2 | 4/2010 | Dolph | |
| 7,774,815 B1 | 8/2010 | Allen | |
| 2005/0253964 A1* | 11/2005 | Janssen et al. | 348/459 |
| 2007/0040935 A1* | 2/2007 | Lee et al. | 348/452 |
| 2007/0286499 A1* | 12/2007 | Freiburg et al. | 382/229 |
| 2010/0214485 A1* | 8/2010 | Tkachenko | 348/598 |
| 2010/0277644 A1* | 11/2010 | Blume | 348/452 |

* cited by examiner

*Primary Examiner* — Victor Kostak

(57) ABSTRACT

Described embodiments provide for detection and selection by the user of a ticker region within a first video broadcast; and copying and overlaying the detected and selected ticker region over a second video broadcast. Motion estimation techniques are employed to identify the ticker region location and associated borders of the ticker region. The streaming video corresponding to the ticker region is buffered. Some embodiments allow for post-processing of the overlayed ticker region to, for example, eliminate artifacts of, match resolution to, and match aspect ratio of the overlayed ticker region to the second video broadcast.

13 Claims, 3 Drawing Sheets

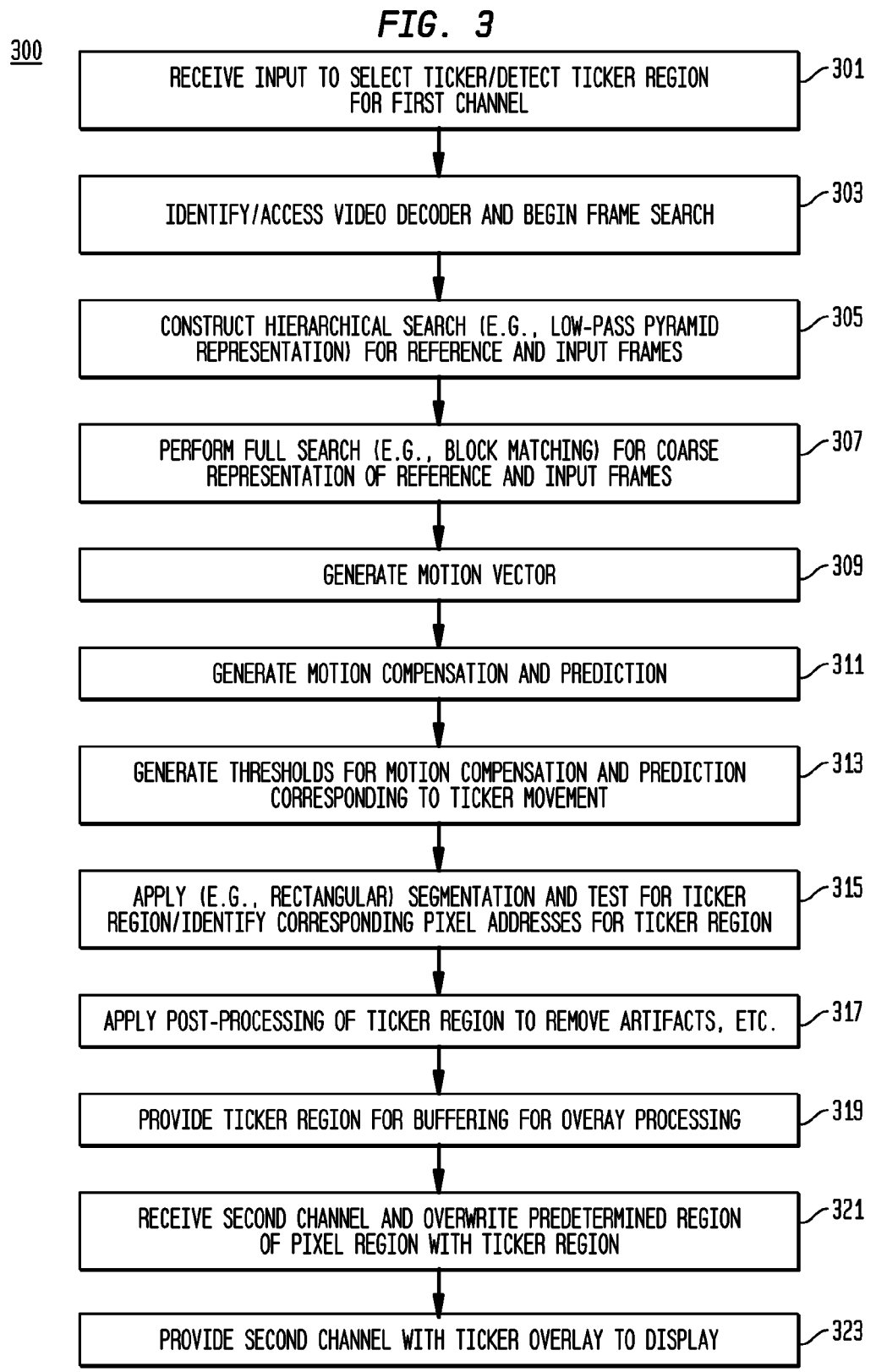

TELEVISION TICKER OVERLAY

BACKGROUND

Television, cable and satellite broadcasts often include audio and video for a television program, while simultaneously showing an image in a portion of the screen for providing data updates. For example, many sports and news networks include a scrolling image in a portion of the screen, for example, a top or bottom section of the screen, to display sports scores, stock prices, weather updates, news updates and other data updates. These images are commonly known as "tickers".

Some television systems have employed picture-in-picture (PiP) to display a ticker from a first channel, while a user watches a program from a second channel, for example as described in U.S. Pat. No. 6,833,874 to Ozaki et al. However, PiP systems typically show image data from one of the channels in a compressed viewing ratio shown in a static portion of the television screen. Further, modern digital television systems typically include multiple decoders to decode audio and video data from more than one channel at once.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for a ticker overlay. An encoded first video channel having a ticker in a ticker region of the first video channel, and an encoded second video channel are received and decoded, the first video channel and the second video channel specified by a user. Based on an input from the user, the ticker of the decoded first video channel is selected for overlay; and the ticker region of the selected ticker is detected based on a motion estimation ticker region detection algorithm. The determined ticker region is buffered; and the determined ticker region is overlayed on the decoded second video channel.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

FIG. 3 shows an exemplary process of providing ticker overlay in accordance with exemplary embodiments.

DETAILED DESCRIPTION

Described embodiments provide for, under user control, detection and selection by the user of a ticker region within a first video broadcast; and copying and overlaying the detected and selected ticker region over a second video broadcast. Typically, a user might navigate a pointer or similar indicator over a broadcast to select the ticker in the first broadcast for overlay via a television remote control device. Once selected, the television's processor, which might include one or more modules related to the decoding of a digitally encoded video/audio broadcast (e.g., MPEG encoded digital pictures), employs motion estimation techniques to identify the ticker region location and associated borders of the ticker region. The streaming video corresponding to the ticker region is buffered. The user might then select the second broadcast, and the processor then inserts the buffered ticker region within the second broadcast at a default or user-specified location. Some embodiments allow for post-processing of the overlayed ticker region to, for example, eliminate artifacts of, match resolution to, and match aspect ratio of the overlayed ticker region to the second video broadcast.

Embodiments of the present invention might provide the following benefits. By detecting ticker regions with motion-estimation based techniques during decoding and overlaying decoded ticker regions on decoded picture regions, ticker overlay is generally simpler to implement. Further, such motion-estimation based techniques allow for processing over the luminance values only, simplifying and speeding up such process.

Table 1 defines a list of acronyms employed throughout this specification as an aid to understanding the described embodiments of the present invention:

TABLE I

| USB | Universal Serial Bus | DVD | Digital Versatile Disc or Digital Video Disc |
|---|---|---|---|
| HD | High Definition | TV | Television |
| 3D | Three Dimensional | PiP | Picture-in-Picture |
| DTV | Digital TV | ATV | Analog TV |
| A/V | Audio/Video | MPEG | Moving Picture Experts Group |

Figure 1:
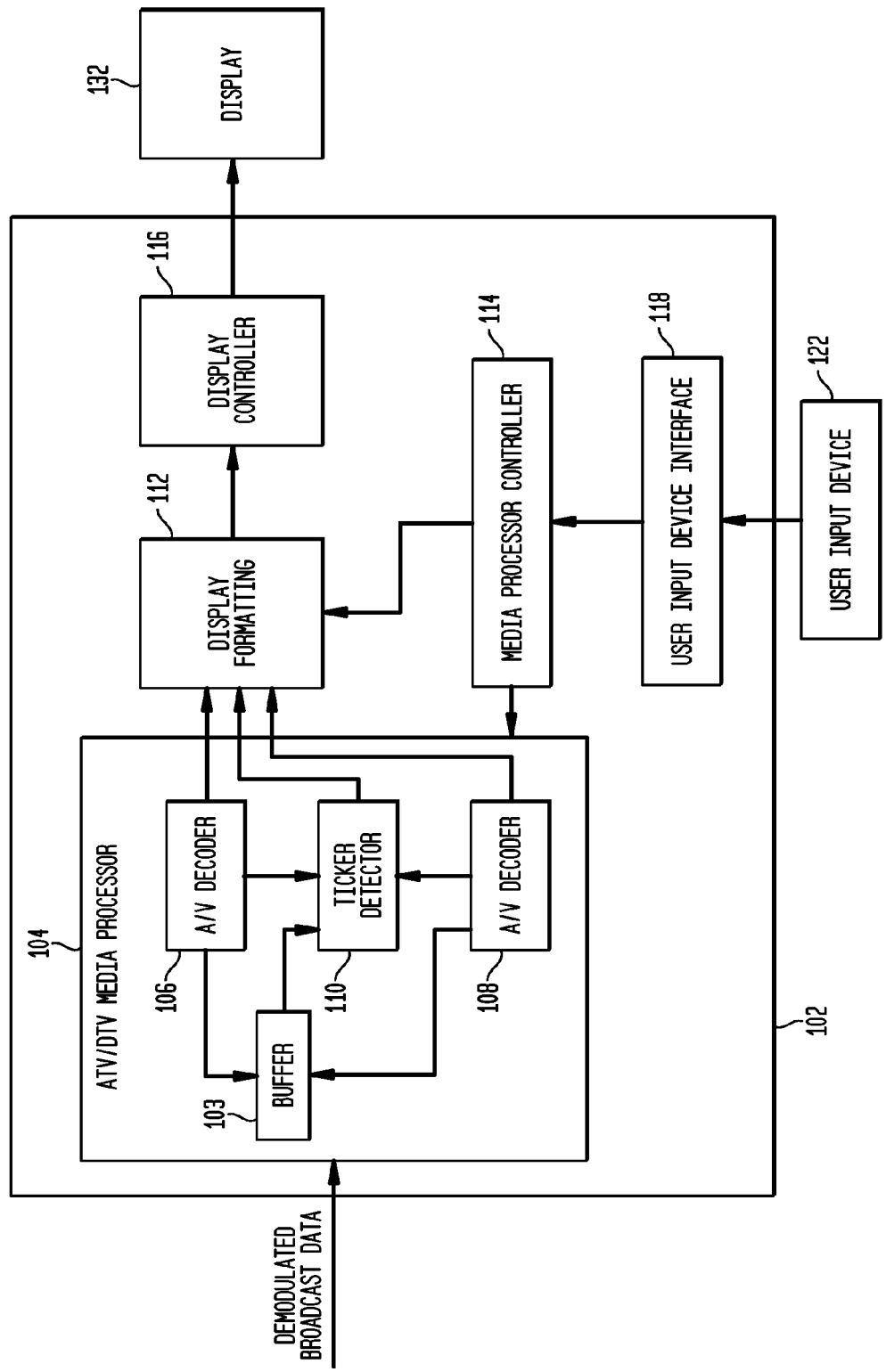
FIG. 1 shows an exemplary block diagram of an electronics system providing ticker overlay in accordance with exemplary embodiments.

FIG. 1 shows an exemplary block diagram of an electronics system 100 providing ticker overlay in accordance with exemplary embodiments. System 100 includes digital television (DTV) unit 102, user input device 122, and display 132. DTV unit 102 typically includes demodulation or other circuitry (not shown FIG. 1) employed to receive and generate demodulated broadcast data from several channels through, for example, a service provider. DTV unit 102 may be, for example, a cable, fiber or satellite dish set-top box, though the present invention is not so limited to these devices, and might be implemented in a computing device and the like. Demodulated broadcast data might include digitally encoded video and/or audio data, such as digital television (DTV) as is specified under one or more standards developed by the Moving Picture Experts Group (MPEG), such as MPEG-2 or -4 encoded video. Other types of demodulated broadcast data might also be received, such as analog television (ATV) in various formats.

User input device 122 represents circuitry employed to allow a user to select functions and communicate such selections to the DTV unit 102. User input device 122 can be embodied as, for example, a separate remote controller having wireless, infrared, or other forms of communication employed in conjunction with DTV unit 102 and/or display 132 (e.g., a set-top box remote). The present is not so limited, however, and the user input device might simply represent a mouse keyboard, buttons or other manual input coupled to DTV unit 102. Display 132 represents a video display device, such as a cathode-ray tube (CRT), plasma panel, or liquid crystal display (LCD) where video is provide to the user.

Interaction between user input device 122, user input device interface 118, and media processor controller 114 in some embodiments might allow for a pointer function that allows a user to select positions or regions on the video picture viewed on display 132.

Aspects of DTV unit 102 are described in further detail below. DTV unit 102 includes ATV/DTV media processor 104, media processor controller 114 (which might typically be integrated with ATV/DTV media processor 104 as a system on chip (SoC)), user input device interface 118, display formatting module 112, and display controller 116. ATV/DTV media processor 104, in turn, includes at least two audio/video decoders shown as A/V decoders 106 and 108, and ticker detector 110 operating in accordance with embodiments of the present invention. DTV unit 102, as well as the various devices within DTV unit 102, typically have associated memory for storage and access of processed or received data, including that of video and audio encoded/decoded data, shown generally in FIG. 1 as buffer 103.

In operation, a user might select one or more channels for viewing on display 132. Consequently, the user might enter such selection (herein, channel 1) on user input device 122, which in turn communicates the selection to media processor controller 114 through user input device interface 118. Media processor controller 114 processes the received selection to provide commands to ATV/DTV media processor 104 to select the desired channel from the demodulated broadcast data and provide the associated encoded video and audio data to one of A/V decoders 106 and 108 (for the following, A/V decoder 106 is associated with the decoding of channel 1). A/V decoder 106 decodes the encoded video, which for example is in an MPEG-2 format, and provides the decoded video data to display formatting module 112.

Display formatting module 112 performs various functions, such as modifying the resolution, stretching or shrinking the video picture, inserting picture-in-picture information (i.e., merging two pictures) and the like. Consequently, display-formatting module 112 provides as output pixel information related to the decoded and processed video for display on display 132. Display controller 116, in turn, processes the pixel information related to the decoded video into signals to drive corresponding pixels of display 132.

The decoded video channel 1 might contain a ticker—a region (herein, ticker region) of the video picture that the broadcast station has inserted into the channel containing streaming data. Such data might be included as packetized data in the packetized encoded video data, and such data might be, for example, real-time stock or financial information, news information, sports information, channel or service provider information, weather alerts, and the like. Consequently, in accordance with described embodiments, the user might select such ticker region of channel 1 for display on other channels through input to user input device 122. User input device 122, in turn, communicates the selection of the ticker to media processor controller 114 through user input device interface 118.

Under control of media processor controller 114, ATV/DTV media processor 104 instructs A/V decoder 106 to provide decoded video data to ticker detector 110. Using motion estimation techniques as described subsequently, ticker detector 110 detects the ticker region of channel 1 decoded by A/V decoder 106. The decoded video portion corresponding to the ticker region is extracted, is temporarily buffered (e.g., by buffer 103 of FIG. 1), and provided to display-formatting module 112. Display formatting module 112 also receives commands from media processor controller 114 that specifics the region, size, resolution, aspect ratio, position and so forth of the selected ticker region of channel 1 for display on subsequent channels.

After, the automatic selection of the ticker is performed, the user can tune in a different channel and enable the ticker region from the previous channel to be overlaid on the current channel. The ticker buffering is automatically refreshed by the detection/selection algorithm of ticker detector 110. This occurs because typically, DTV and STB systems employ dual video decoding capability. Rendering the aspect ratio of the ticker correctly in the current viewed video channel is important. So, display formatting module 112 interpolates properly the sticker for the final overlay over the watched channel.

Subsequently, the user, through input commands selects another broadcast channel in a manner as described above with respect to channel 1. This second selected channel (herein, channel 2) is provided to A/V decoder 108 for decoding from the demodulated broadcast data, and the decoded video is provided to display formatting module 112. Display formatting module 112 also receives commands from media processor controller 114 that specifies the region, size, resolution, aspect ratio, position and so forth of the selected ticker region of channel 1 for display on subsequent channels, such as channel 2. Display formatting module 112 then overlays the processed ticker region of channel 1 to a specified area of the channel 2 video picture by, for example, over-writing pixel values with the ticker region pixel values. In some embodiments, display formatting module 112 also detects the presence or absence of ticker region data, enabling or disabling the overlay of the channel 1 ticker region, respectively.

Figure 2A:
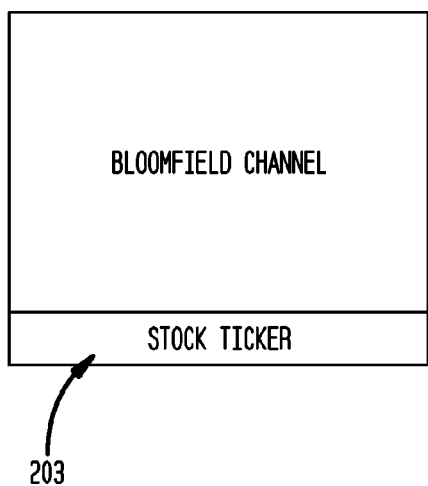
FIGS. 2A through 2D show exemplary television broadcasts illustrating a ticker overlay from a first broadcast to a second broadcast.
Figure 2B:
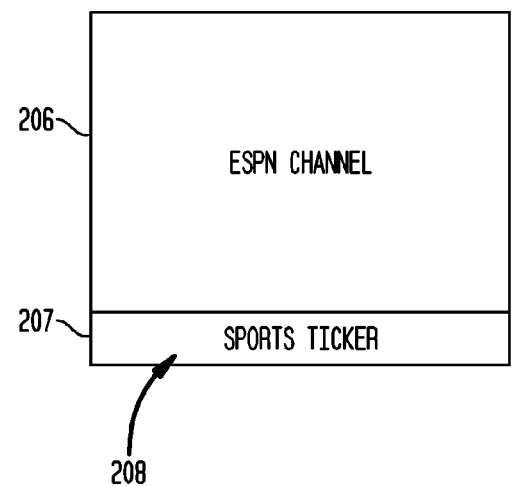
Figure 2C:
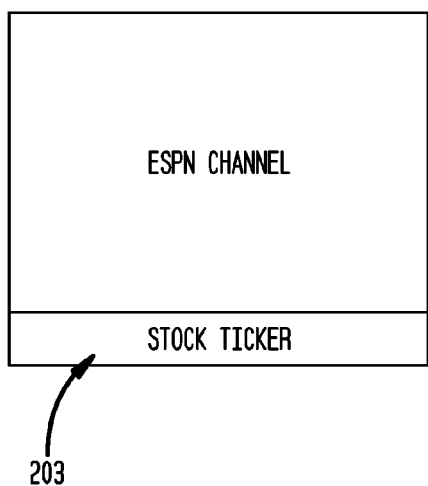

FIGS. 2A through 2D show exemplary television broadcasts illustrating a ticker overlay from a first broadcast to a second broadcast. For example, as shown in FIG. 2A, a user employs the remote input device to navigate to a channel 1 (e.g., Bloomfield financial information). Picture 200 includes a content region 201 and a ticker region 202 having ticker 203. Using the remote input device, the user selects the ticker 203 to overlay (a ticker having real time stock prices) from channel 1, and, thus, the user selects that the ticker on channel 1 to be extracted. Using the remote input device, as shown in FIG. 2B, the user navigates to a channel 2 (e.g., ESPN sports). Picture 250 includes a content region 206 and optionally a ticker region 207 having ticker 208. Using the remote input device, the user selects to overlay the ticker from channel 1 onto channel 2. Picture 200 includes a content region 201 and a ticker region 202 having ticker 203. As shown in FIG. 2C, the ticker 203 from channel 1 (the real-time stock prices) is overlaid onto the ticker region 207 of channel 2 so that the user can watch both simultaneously.

Figure 2D:
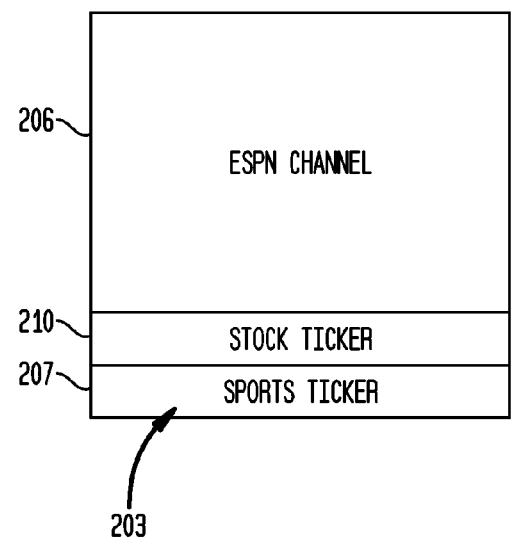

As would be apparent to one skilled in the art, numerous variations to the above example might exist. For example, if the ticker from channel 1 (e.g., a stock price ticker) is to be overlaid on channel 2, and a ticker (e.g., ticker 208 as shown in FIG. 2B) is already present on channel 2 (e.g., a sports score ticker), a user might select the ticker on channel 2 to be hidden or left as viewable. In such case, some embodiments employ such motion-estimation based techniques to detect the presence (or absence) and corresponding location of the ticker region in channel 2. Such case is shown in FIG. 2D, where ticker 203 is now overlaid on region 210 above ticker 207. In addition, more than one ticker can be selected from corresponding ones of various, multiple-available channels and overlaid onto one or more other channels. For example, if a television picture display is divided into multiple viewing regions, user-selected tickers might be overlayed on one or more of the multiple viewing regions. As described herein, since the various tickers are not necessarily independently extracted from the primary broadcast, the various tickers can be recorded, paused, or otherwise processed independent of the primary broadcast, providing increased functionality and flexibility to the user. In addition, a ticker of one channel might be overlayed directly on the ticker of the second channel, so as to hide it.

In order to detect a ticker region in the decoded video picture, described embodiments use motion estimation and compensation to detect and extract the ticker region of interest. Dynamic tickers generally move through the picture with near-uniform velocity, and ticker detector 110 might advantageously use such knowledge to detect the presence, absence and location of ticker regions. Motion estimation that uses block-based algorithms are generally implemented on a processor chip that has full search block motion estimation capability. Block-based motion estimating algorithms are well known in the art of video processing. Block-based motion estimating algorithms are described in a comprehensive way, for example, in A. M. Tekalp, Digital Video Processing, Englewood Cliffs, N.J.; Prentice-Hall, 1995; with earlier works in A. N. Netravali and J. D. Robbins, Motion-Compensated Television Coding: Part I, BSTJ, 58(3):631-670, March 1979; and A. N. Netravali and J. A. Stuller, Motion-Compensated Television Coding: Part I, BSTJ, 58(7): 1703-18, September 1979.

FIG. 3 shows an exemplary process 300 of providing ticker overlay in accordance with exemplary embodiments. An exemplary motion estimation-based ticker region detection algorithm based on motion estimation/compensation for sticker detection is then described.

Referring to FIG. 3, at step 301, process 300 receives input command to select a ticker from a channel (e.g., the first channel). At step 303, process 300 identifies/accesses the video decoder to begin frame search of the channel. At step 305, process 300 constructs a hierarchical search (e.g., low-pass pyramid representation) for reference and input frames.

At step 307, process 300 performs a full search (e.g., block matching) for coarse representation of reference and input frames. This coarse search needs only luminance values for processing. At step 309 and 311, respectively, process 300 generates motion vectors and then motion compensation and prediction values for the search. At step 313, process 300 generates Thresholds for motion compensation and prediction corresponding to ticker movement. Using these thresholds, at step 315, process 300 applies (e.g., rectangular) segmentation to the frame(s) and tests for the presence or absence of the ticker region. This might include testing for a central region of the ticker region. These tests allow for identifying corresponding pixel addresses for ticker region.

At step 317, post-processing and/or filtering of the ticker region is performed to reduce/eliminate artifacts, distortion, or other discontinuities, especially at the borders. At step 319, the identified ticker region of the decoded video stream is then provided from the corresponding video decoder for buffering (e.g., by buffer 103 of FIG. 1). At step 321, the user-selected second channel is identified, and the pixels of the ticker region of the decoded video stream of the first channel are overwritten onto the corresponding pixel addresses of the second channel at a predetermined region of the picture. At step 323, the second channel with the overlay-ticker region is provided to the display.

Application of the motion estimation-based ticker region detection algorithm of FIGS. 1 and 3 is now described. The motion estimation-based ticker region detection algorithm uses hierarchical block matching in which full-search block motion estimation is performed in a reference frame having lower spatial resolution than the input frame. A low-pass pyramid representation is constructed for the reference frame and the input frame using the following equation (1):

$$f_l(n_x, n_y, n_t) = \left( \sum_{i=0}^{I-1} \sum_{j=0}^{J-1} h[i][j] \times f_{l-1}\left(2n_x + i - \frac{I-1}{2}, 2n_y + ji - \frac{J-1}{2}, n_t\right) \right), \quad (1)$$

where $f_l$ denotes the frame in the l-th coarse resolution, L represents the number of coarse representations in the hierarchy, $1 \leq l \leq L$, and $h[i][j]$ denotes the filter coefficients with I and J denoting the number of filter taps.

A full-search block match algorithm is performed between the coarse input frame and the coarse representation of the reference frame at the last level, using an absolute difference distortion measure as the basis for matching. With an 8×8 (for example) block, the minimum distortion, D, is the one found after exhaustive search in a search region $R_l$ of the coarse representation reference frame. The minimum distortion D(.) for an 8×8 exemplary block is defined by equation (2):

$$D\left(\frac{n_x}{8}, \frac{n_y}{B}\right) = \min_{(d_{x,L}, d_{y,L}) \in R_L} \sum_{i=0}^{8} \sum_{j=0}^{8} \left| f_L\left(\frac{n_x}{8} + i, \frac{n_y}{8} + j, n_t\right) - f_L\left(\frac{n_x}{8} + i + d_{x,L}, \frac{n_y}{8} + j + d_{y,L}, n_t - T\right) \right|. \quad (2)$$

where $d_l$ represents the displacement vector in the search region $R_l$ (defined by the grid $d_{xL} \leq |N_{x,L}| \times d_{syL} \leq |N_{xL}|$) that minimizes D(.) in the above equation (2). The value N is the size of the reference frame at level L in the x or y direction, T denotes the temporal distance of the reference frame from the input frame, $f_l$ denotes the reference frame at level L, and |•| is the absolute value. When T is negative this indicates motion estimation in the forward direction (increasing in time). After finding the displacement vector at level L, a scaled version of the displacement vector is propagated to the next level L-1 of the pyramid. A new search is performed in a search region around the point $2 \times d_l$. In general, the search region is $R_{L-1}$ smaller than the original search region $R_L$. This procedure is iterated to the base of the pyramid (i.e., to fields with the original size). The final motion vector might be described as in equation (3):

$$v(v_x, v_y) = 2(d_{x,1}, d_{y,1}) + (d_x, d_y) \quad (3)$$

where $(d_x, d_y)$, is the displacement in R. The motion vector with integer pixel accuracy v is then found.

Motion estimation is performed between the input frame $n_i$ and the temporally adjacent frame $n_i-1$. In this case T=1 is used when the source material is progressive. When T=2, motion estimation is based on a field (picture) of the same parity as the input field. An interlaced picture has two fields: top_field and bottom_field. If the input (current) field is a top_field, with T=2, the other field is also top_field type. If the input (current) field is a bottom_field, with T=2, the other field is also bottom_field type.

The motion vector field v can be described generally as in equation (4):

$$v = [v_x, v_y]^T = \text{argmin}_{(d_x, d_y)} \Sigma_{(d_x, d_y) \in R} |f(n_x, n_y, n_t) - f(n_x - d_x, n_y - d_y, n_t - T)| \quad (4)$$

with T defining the direction of motion as previously described. The ranges of vector coordinate values used by the motion estimation can vary according to the original picture resolution.

Next, the frame $n_t-1$ is motion compensated using the vector field denoted by v, to find the relative best prediction of the samples of the input frame. In case of a field picture, the field $n_t-2$ is motion compensated. In order to detect the areas where motion compensation works relatively perfectly a line activity measure A(.) is defined as in equation (5):

$$A\left(\frac{n_x}{M}, n_y n_t\right) = \sum_{l=0}^{8} |f(i, n_y, n_t) - f_{mc}(i, n_y, n_t)| \quad (5)$$

Where M denotes the picture line length in pixels. This computation is preferably performed on the luminance component only, and the sum of A(.)'s should be close to zero for a ticker region. This region has in general rectangular format. The set of blocks that belongs to the rectangular part of the picture will have them ΣA~0. Motion compensation prediction should be almost perfect since a ticker move across the picture with uniform velocity. In order to prevent misclassifications due to noise and border effects is interesting to threshold the activities via threshold function B(.) in equation (6):

$$B\left(\frac{n_x}{M}, n_y, n_t\right) = \begin{cases} 1 A \leq T_a \\ 0 A > T_a \end{cases} \quad (6)$$

In equation (6), $T_a$ is a threshold where $T_a=32M$ is a prefered value for an entire length of a picture line.

After this threshold of equation (6) is calculated, a rectangular segmentation is applied. All the lines of the current picture that have B(.)'s equal to 1 for consecutive lines are grouped. If the line addresses of the B(.)'s equal to 1 are larger than the line address that corresponds to ¾ of the picture height, this region is determined as a ticker region. After rectangular segmentation, the address computation of the ticker region is performed. These thresholds and related computations are employed since ticker regions are inserted by production studios in either the top or bottom of the broadcast picture, and the user has flagged that there is, in fact, a ticker in the current decoded picture. The segment of the picture that represents the ticker is stored for later use.

While the previous has been described with respect to detection of a ticker at the top and/or bottom of the picture, the present invention is not so limited. One skilled in the art might readily extend the teachings herein to detection of ticker or similar regions in other locations of a picture.

In general, ticker regions overlaid on the main picture content may have artifacts. Therefore, post-processing of this region might be performed, thereby eliminating artifacts that were originated by the broadcast of main channel video with the ticker information. This post-processing of this region might occur by several different non-linear filtering algorithms, such as implemented with noise-reduction filters that preserve edge information. News, sports and financial ticker information are, in general, broadcast with solid-color background and foreground, so blending artifacts is of relatively minor complexity. New color attributes can be associated with this ticker region, such as background color and foreground color and new alpha-blend values. In general, such color attributes are user selectable.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A method of providing for a ticker overlay comprising:
receiving and decoding i) an encoded first video channel having a ticker in a ticker region of the first video channel and ii) an encoded second video channel, the first video channel and the second video channel specified by a user;
selecting, based on an input from the user, the ticker of the decoded first video channel for overlay;
determining the ticker region of the selected ticker based on a motion estimation ticker region detection algorithm;
buffering the determined ticker region;
monitoring for and detecting a location of a corresponding ticker of the second video channel;
overlaying the determined ticker region on the decoded second video channel so as to avoid the corresponding ticker of the second video channel; and
displaying the determined ticker region on the decoded second video channel.

2. The method according to claim 1, comprising:
monitoring the ticker of the first video channel;
detecting a presence and an absence of the ticker of the first video channel; and
enabling and disabling, based on the detected presence and absence respectively of the ticker of the first video channel, the overlaying of the determined ticker region on the decoded second video channel.

3. The method according to claim 1, wherein determining the ticker region of the selected ticker based on a motion estimation ticker region detection algorithm detects the region based on luminance components.

4. The method according to claim 1, wherein the determining the ticker region of the selected ticker based on the motion estimation ticker region detection algorithm comprises:
identifying first and second frames of the first channel;
constructing a hierarchical search based on the first and second frames;
searching the first and second frames;
generating motion vector and corresponding motion compensation and prediction information for the first and second frames;
generating thresholds for the motion compensation and prediction information corresponding to ticker movement;
segmenting and testing at least one of the first and second frames to identify pixel and corresponding pixel location information to generate the determined ticker region.

5. The method according to claim 1, wherein the buffering the determined ticker region further comprises filtering and post-processing the determined ticker region.

6. The method of claim 1, wherein the method is implemented by a machine executing program code encoded on a non-transitory machine-readable storage medium.

7. An apparatus for providing a ticker overlay comprising:
a media processor comprising at least two video decoders, the media processor configured to receive and decode i) an encoded first video channel having a ticker in a ticker region of the first video channel and ii) an encoded second video channel, the first video channel and the second video channel specified by a user;
a media processor controller configured to select, based on an input from the user, the ticker of the decoded first video channel for overlay;
a ticker detector, coupled to the at least two video decoders, configured to determine the ticker region of the selected ticker based on a motion estimation ticker region detection algorithm;
a buffer for buffering the determined ticker region;
wherein the ticker detector monitors for and detects a location of a corresponding ticker of the second video channel; and
a display formatting module configured to overlay the determined ticker region on the decoded second video channel so as to avoid the corresponding ticker of the second video channel.

8. The apparatus according to claim 7, wherein:
the ticker detector is configured to monitor the ticker of the first video channel; and
detect a presence and an absence of the ticker of the first video channel; and
the display formatting module is configured to enable and disable, based on the detected presence and absence respectively of the ticker of the first video channel, the overlaying of the determined ticker region on the decoded second video channel.

9. The apparatus according to claim 7, wherein the ticker detector is configured to determine the ticker region of the selected ticker based on a motion estimation ticker region detection algorithm detects the region based on luminance components.

10. The apparatus according to claim 7, wherein the ticker detector is configured to determine the ticker region of the selected ticker based on a motion estimation ticker region detection algorithm by:
identifying first and second frames of the first channel;
constructing a hierarchical search based on the first and second frames;
searching the first and second frames;
generating motion vector and corresponding motion compensation and prediction information for the first and second frames;
generating thresholds for the motion compensation and prediction information corresponding to ticker movement;
segmenting and testing at least one of the first and second frames to identify pixel and corresponding pixel location information to generate the determined ticker region.

11. The apparatus according to claim 7, wherein the buffer is configured to filter and post-process the determined ticker region.

12. The apparatus according to claim 7, further comprising a display controller configured to display the determined ticker region on the decoded second video channel from the display formatting module.

13. A video processing system comprising:
a display configured to display a video image;
a remote device configured to receive user input;
a digital television video system configured to, based on the user input from the remote device:
receive and decode i) an encoded first video channel having a ticker in a ticker region of the first video channel and ii) an encoded second video channel, the first video channel and the second video channel specified by the user input;
select, based on the user input, the ticker of the decoded first video channel for overlay;

determine the ticker region of the selected ticker based on a motion estimation ticker region detection algorithm;

monitor for and detect a location of a corresponding ticker of the second video channel buffer the determined ticker region;

overlay the determined ticker region on the decoded second video channel so as to avoid the corresponding ticker of the second video channel; and display on the display the determined ticker region on the decoded second video channel.

\* \* \* \* \*